United States Patent
Johnston

(10) Patent No.: US 9,286,386 B2
(45) Date of Patent: *Mar. 15, 2016

(54) SYSTEM AND METHOD FOR AN ITERATIVE DISAMBIGUATION INTERFACE

(71) Applicant: AT&T Intellectual Property I, L.P., Atlanta, GA (US)

(72) Inventor: Michael Johnston, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/558,780

(22) Filed: Dec. 3, 2014

(65) Prior Publication Data
US 2015/0088920 A1 Mar. 26, 2015

Related U.S. Application Data

(63) Continuation of application No. 12/649,609, filed on Dec. 30, 2009, now Pat. No. 8,914,396.

(51) Int. Cl.
*G06F 17/30* (2006.01)

(52) U.S. Cl.
CPC .... *G06F 17/30843* (2013.01); *G06F 17/30976* (2013.01)

(58) Field of Classification Search
CPC .............. G06F 17/30017; G06F 17/30395
USPC .................. 707/718, 722, 766, 914
See application file for complete search history.

(56) References Cited

U.S. PATENT DOCUMENTS

| | | | | |
|---|---|---|---|---|
| 6,513,063 B1 * | 1/2003 | Julia | ................ | G06F 9/465 707/765 |
| 6,757,718 B1 * | 6/2004 | Halverson | ........... | G06F 9/465 704/257 |
| 6,910,003 B1 * | 6/2005 | Arnold | ............ | G06F 17/30616 704/1 |
| 7,921,154 B2 * | 4/2011 | Ballou | ............ | H04M 3/4938 707/621 |
| 8,200,246 B2 * | 6/2012 | Khosravy et al. | ....... | 455/456.3 |
| 8,326,634 B2 * | 12/2012 | Di Cristo | ............. | G06F 17/279 704/257 |

(Continued)

OTHER PUBLICATIONS

Alan Smeaton, "iBingo Mobile Collaborative Search," ACM, 2008, p. 1.*

(Continued)

*Primary Examiner* — Robert Beausoliel, Jr.
*Assistant Examiner* — Alexandria Bromell

(57) ABSTRACT

Disclosed herein are systems, methods, and computer-readable storage media for an iterative disambiguation interface. A system practicing the method receives a search query formatted according to a standard XML markup language for containing and annotating interpretations of user input, the search query being based on a natural language spoken query from a user and retrieves search results based on the search query. The system transmits the search results to a user device and iteratively receives multimodal input from the user to change search attributes and transmits updated search results to the user device based on the changed search attributes. The search results can include a link to additional information, such as a video presentation, related to the search results. The standard XML markup language can be Extensible MultiModal Annotation (EMMA) markup language from W3C. The system can generate an iteration transaction history for each multimodal input and updated search result.

20 Claims, 7 Drawing Sheets

(56) References Cited

U.S. PATENT DOCUMENTS

| | | | | |
|---|---|---|---|---|
| 2006/0195521 A1* | 8/2006 | New | ............... | G06F 17/30766 709/204 |
| 2007/0174273 A1* | 7/2007 | Jones | ............... | G06F 17/30864 707/722 |
| 2008/0162471 A1* | 7/2008 | Bernard | ............... | G06F 17/30017 707/718 |
| 2009/0024581 A1* | 1/2009 | Pickens | ............... | G06F 17/30867 707/766 |
| 2009/0034463 A1* | 2/2009 | Rao | ............... | 370/329 |
| 2009/0157392 A1* | 6/2009 | Alewine | ............... | G10L 15/183 704/201 |
| 2009/0171663 A1* | 7/2009 | Badt | ............... | G10L 15/187 704/257 |
| 2009/0307629 A1* | 12/2009 | Horiuchi | ............... | G06F 3/04817 715/810 |
| 2010/0066684 A1* | 3/2010 | Shahraray | ............... | G06F 3/038 345/173 |
| 2010/0235314 A1* | 9/2010 | Nolan | ............... | G06F 17/30702 706/52 |
| 2012/0065982 A1* | 3/2012 | Ativanichayaphong | | G06F 9/4446 704/270.1 |
| 2012/0194682 A1* | 8/2012 | Huo | ............... | H04N 7/17318 348/158 |

OTHER PUBLICATIONS

Michael Johnston and Srinivas Bangalore, "Combining Stochastic and Grammar Based Language Processing with Finite State Edit Machines," pp. 238-243, Automatic Speech Recognition and Understanding, 2005, IEEE Workshop.

* cited by examiner

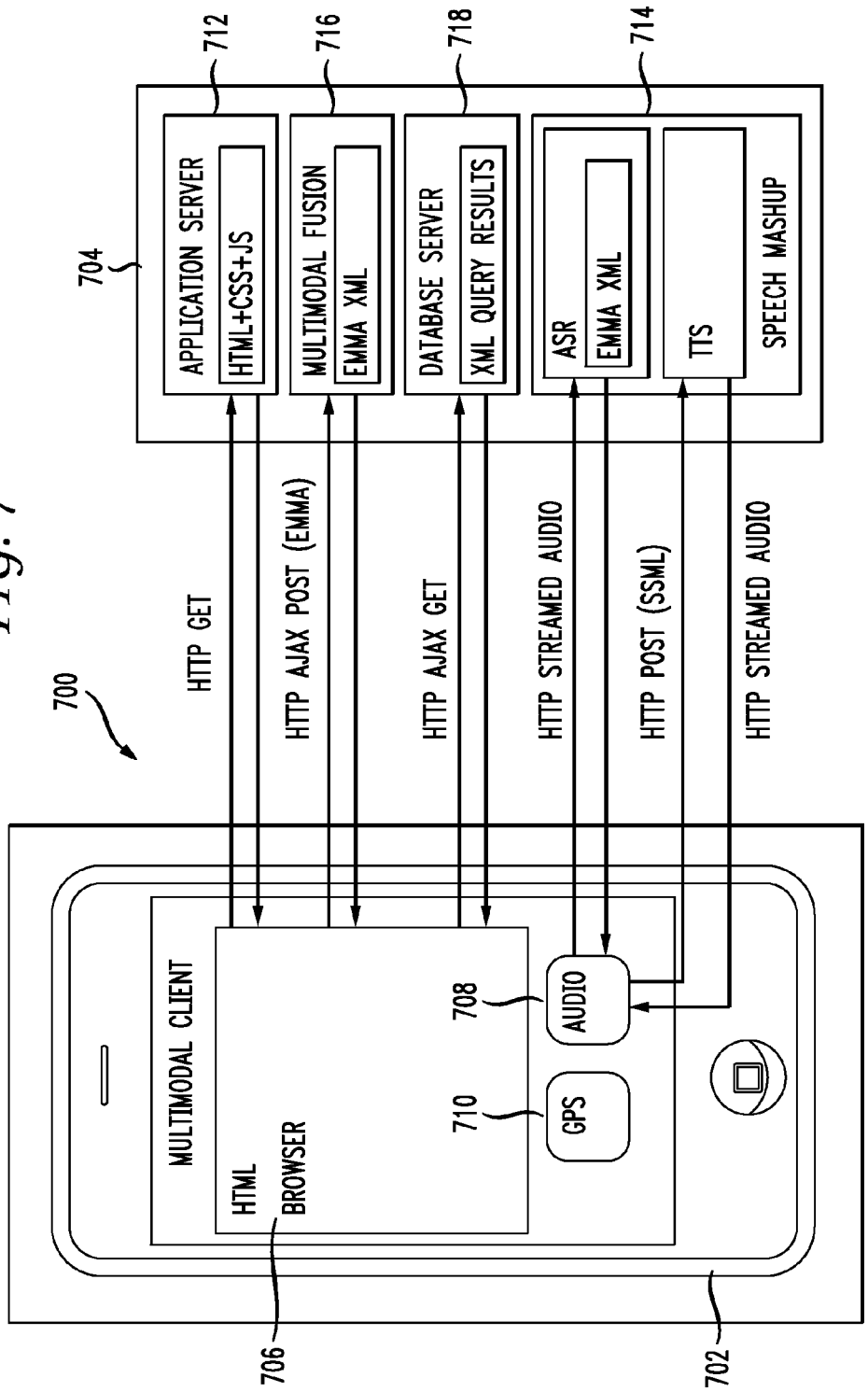

SYSTEM AND METHOD FOR AN ITERATIVE DISAMBIGUATION INTERFACE

PRIORITY INFORMATION

The present application is a continuation of U.S. patent application Ser. No. 12/649,609, filed Dec. 30, 2009, the content of which is incorporated herein by reference in its entirety.

BACKGROUND

1. Technical Field

The present disclosure relates to mobile search and more specifically to iterative multimodal interfaces for disambiguating search results.

2. Introduction

While numerous research prototypes have been built over the years, building multimodal interfaces remains a complex and highly specialized task. Typically these systems involve a graphical user interface working in concert with a variety of different input and output processing components, such as speech recognition, gesture recognition, natural language understanding, multimodal presentation planning, dialog management, and multimodal integration or fusion. A significant source of complexity in authoring these systems is that communication among components is not standardized and often utilizes ad hoc or proprietary protocols. This makes it difficult or impossible to plug-and-play components from different vendors or research sites and limits the ability of authors to rapidly pull components together to prototype multimodal systems.

The new W3C EMMA standard is one example of how to address this problem by providing a standardized XML representation language for encapsulating and annotating inputs to spoken and multimodal interactive systems. Certain applications on mobile computing platforms could benefit from application of such standardized representations of spoken and multimodal inputs.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 7 illustrates an example multimodal client and servers architecture.

DETAILED DESCRIPTION

Figure 1:
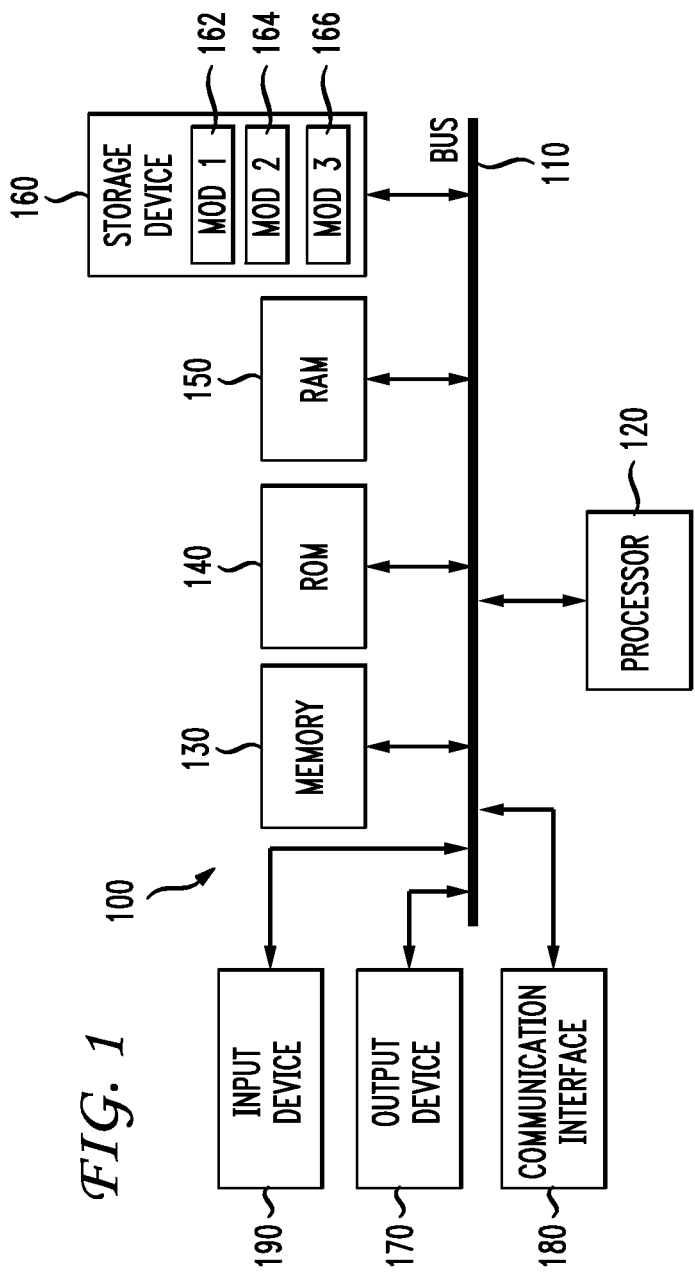
FIG. 1 illustrates an example system embodiment.

Multimodal interfaces combining natural modalities such as speech and touch with dynamic graphical user interfaces can make it easier and more effective for users to interact with applications and services on mobile devices. However, building these interfaces remains a complex and high specialized task. The W3C Extensible MultiModal Annotation markup language (or EMMA) standard is one exemplary standard which provides a representation language for inputs to multimodal systems facilitating plug-and-play of system components and rapid prototyping of interactive multimodal systems. The approaches set forth herein can incorporate suitable standards from other standards bodies as well. This disclosure illustrates the capabilities of standards such as EMMA in a mobile multimodal application for a mobile computing device such as a smartphone.

While this disclosure discusses the EMMA standard in some detail for illustrative purposes, the principles disclosed herein are applicable to any such standard, whether the standard is openly developed, proprietary, or otherwise.

EMMA is an XML specification intended for use by systems that provide semantic interpretations for a variety of inputs, including but not necessarily limited to, speech, natural language text, GUI and ink input. In one aspect, this markup is used primarily as a standard data interchange format between the components of a multimodal system.

EMMA focuses on annotating single inputs from users, which may be either from a single mode or a composite input combining information from multiple modes, as opposed to information that might have been collected over multiple turns of a dialog. The language provides a set of elements and attributes that are focused on enabling annotations on user inputs and interpretations of those inputs.

EMMA documents can hold at least instance data, a data model, and metadata. Instance data is application-specific markup corresponding to input information which is meaningful to the consumer of an EMMA document. Instances are application-specific and built by input processors at runtime. Given that utterances may be ambiguous with respect to input values, an EMMA document may hold more than one instance. A data model specifies constraints on structure and content of an instance. The data model is typically pre-established by an application, and may be implicit or not explicitly specified. Metadata is annotations associated with the data contained in the instance. Input processes add annotation values are added at runtime.

Given the assumptions above about the nature of data represented in an EMMA document, the following general principles apply to the design of EMMA. First, the main prescriptive content of the EMMA specification consists of metadata. EMMA provides a means to express the metadata annotations which require standardization. Such annotations can express the relationship among all the types of data within an EMMA document. Second, the instance and its data model are assumed to be specified in XML, but EMMA will remain agnostic to the XML format used to express these. The instance XML is assumed to be sufficiently structured to enable the association of annotative data. Third, the extensibility of EMMA lies in the ability for additional kinds of metadata to be included in application specific vocabularies. EMMA itself can be extended with application and vendor specific annotations contained within the emma:info element. The annotations of EMMA are "normative" in the sense that if an EMMA component produces annotations, these annotations can be represented using the EMMA syntax.

In essence, EMMA is the glue which bonds together the disparate components of a spoken or multimodal interactive system. EMMA is an XML markup language which provides mechanisms for capturing and annotating the various stages of processing of users' inputs. There are two key aspects to the language: a series of elements (e.g. emma:interpretation, emma:group, emma:one-of) which are used as containers for interpretations of the user input, and a series of annotation attributes and elements which are used to provide various pieces of metadata associated with inputs, such as timestamps (emma:start, emma:end) and confidence score values (emma: confidence). Given the broad range of input types to be supported, a critical design feature of EMMA is that it does not standardize the semantic representations assigned to inputs, rather it provides a series of standardized containers for mode and application specific markup, and set of standardized annotations for common metadata. The language also provides extensibility through the emma:info element, which is a container for application and vendor specific annotations on inputs. Note that individual EMMA documents are not generally intended to be authored directly by humans, rather they are generated automatically by system components such as speech recognizers and multimodal fusion engines. The specifics of the language are best explained by reference to an example. The EMMA document below is an example of the markup that a natural language understanding component in a system for making air travel reservations might produce.

Sample EMMA Document

```
<emma:emma version="1.0"
    xmlns:emma="http://www.w3.org/2003/04/emma"
    xmlns:xsi="http://www.w3.org/
    2001/XMLSchema-instance"
    xsi:schemaLocation="http://www.w3.org/2003/04/emma
    http://www.w3.org/
    TR/2009/REC-emma-20090210/emma.xsd"
    xmlns="http://www.example.com/example">
<emma:one-of id="r1"
    emma:medium="acoustic"
    emma:mode="voice"
    emma:function="dialog"
    emma:verbal="true"
    emma:start="1241035886246"
    emma:end="1241035889306"
    emma:source="smm:platform=iPhone-2.2.1-5H11"
    emma:signal="smm:file=audio-416120.amr"
    emma:signal-size="4902"
    emma:process="smm:type=asr&version=watson6"
    emma:media-type="audio/amr; rate=8000"
    emma:lang="en-US"
    emma:grammar-ref="gram1"
    emma:model-ref="model1">
<emma:interpretation id="int1"
    emma:confidence="0.75"
    emma:tokens="flights from boston to denver">
        <flt><orig>Boston</orig>
        <dest>Denver</dest></flt>
</emma:interpretation>
<emma:interpretation id="int2"
    emma:confidence="0.68"
    emma:tokens="flights from austin to denver">
        <flt><orig>Austin</orig>
            <dest>Denver</dest></flt>
</emma:interpretation>
</emma:one-of>
<emma:info>
    <session>E50DAE19-79B5-44BA-892D</session>
</emma:info>
<emma:grammar id="gram1"
    ref="smm:grammar=flights"/>
<emma:model id="model1"
    ref="smm:file=movies15b.xsd"/>
</emma:emma>
```

In this case the user has requested information about flights from Boston to Denver. All EMMA documents have the root element emma:emma. This has attributes indicating the version of EMMA and namespace and schema declarations. To simplify the presentation the namespace information is left out in the rest of the examples in this paper. The core of an EMMA document consists of a tree of container elements (emma:one-of, emma:group, and emma:sequence) terminating in a number of emma:interpretation elements. The emma: interpretation element is the main container for the semantic representation of a user input. In the example EMMA document above, the semantic representation is an XML element flt specifying an origin and destination for an airline flight query. In this case there are two possible N-best interpretations of the user input and the element emma:one-of is used as a container for the two competing interpretations, each contained within an emma:interpretation. The other container elements are emma:group for grouping inputs and emma: sequence for representation of sequences of inputs.

Annotations which appear on the emma:one-of are assumed to apply to all of the emma:interpretation elements. The annotations emma:medium and emma:mode provide a classification of user input modality. In this case the medium is acoustic and the specific modality is voice. Multimodal inputs will have multiple values within their medium and mode attributes. The emma:function annotation differentiates, interactive dialog (dialog) from other uses such as recording and verification. The attribute emma:verbal is a boolean indicating whether the input is verbal or not. This is used, for example, to distinguish handwriting (letters) from freehand drawing (lines, areas) in pen input. The attributes emma:start and emma:end are absolute (UNIX style) timestamps indicating the start and end of the user input signal in milliseconds from 1 Jan. 1970. emma:signal contains a Uniform Resource Identifier (URI) pointing to the location of the input signal, in this case an audio file. emma:signal-size indicates the size of that file in 8-bit octets. emma:source provides a description of the device which captured the input. This attribute has an important use case for mobile multimodal applications, where it can be used to indicate the kind of device used to capture the input (e.g. Palm Pre, Apple iPhone, or RIM Blackberry) including the specific model and operating system version. emma:process is a description of the processing stage which resulted in the current interpretation(s). The emma:lang attribute indicates the language spoken in the input signal. emma:media-type contains a MIME type and provides, in this case, a location for specifying the codec and sampling rate for the input (audio in this case). If a grammar is used in the processing it can be specified an emma:grammar element under emma:emma. The attribute emma:grammar-ref on the interpretations or emma:one-of indicates which of (possibly multiple) grammars resulted in that interpretation. Similarly there is an element emma:model which can be used for an inline specification or reference to the data model of the semantic representation. More than one model may be specified, and the emma:model-ref attribute is used to associate interpretations with specific models.

On the emma:interpretation elements the emma:tokens attribute indicates the particular string of words that were recognized and emma:confidence contains a confidence score between 0 and 1 for each interpretation. The ability to represent uncertainty using emma:one-of and emma:confidence is critical for multimodal systems utilizing natural modalities such as speech and gesture recognition where there may be multiple possible interpretations of a user input. In addition to emma:one-of for N-best the standard also provide an element for representation of lattice inputs from speech and other modalities.

Several different EMMA documents maybe generated and consumed in the course of processing a single turn of user input. For example, both speech and gesture recognition may generate EMMA documents containing N-best lists of possible recognition hypotheses. These are consumed by a multimodal fusion component which itself them produces an EMMA document representing the possible joint interpretations of speech and gesture. This document may then be passed to a dialog management component. The emma:derived-from element can be used in order to indicate the previous stage of processing that an interpretation or set of interpretations is derived from. The value can either be a URI pointing to another document, or the earlier stage can be contained with the element emma:derivation and then emma:derived-from from contains a reference to the id of the earlier stage of interpretation.

Another feature of the EMMA language is its support for extensibility, through addition of application or vendor specific annotations. These are contained within the element emma:info. For example, in the sample EMMA document above emma:info contains a session identifier. The use of XML as the language for representing user inputs facilitates the generation and parsing of EMMA documents by EMMA producers and consumers since tools for XML processing and parsing are readily available in almost all programming environments. There is no need to write a specific parser as in the case of proprietary protocol for encoding inputs. It also facilitates the creation, viewing, and manipulation of log files for interactive systems, since these can be manipulated and extended using general purpose XML tools such as XSLT.

The approaches disclosed herein enable a multimodal interface to be developed for non-mobile devices such as desktop computers and mobile devices such as the iPhone by authoring a simple web application and using HTTP and AJAX to communicate with resources such as speech recognition, multimodal fusion, and database access. EMMA or another standards-based language can be used to represent the user input, thereby enabling easy plug and play of system components. One benefit of this solution is that mobile multimodal interfaces for platforms such as the iPhone can be built in hours or days, rather than months to years. The use of a standards-based language for communication among components can facilitate data handling, plug and play of components, and logging and annotation.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the user to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
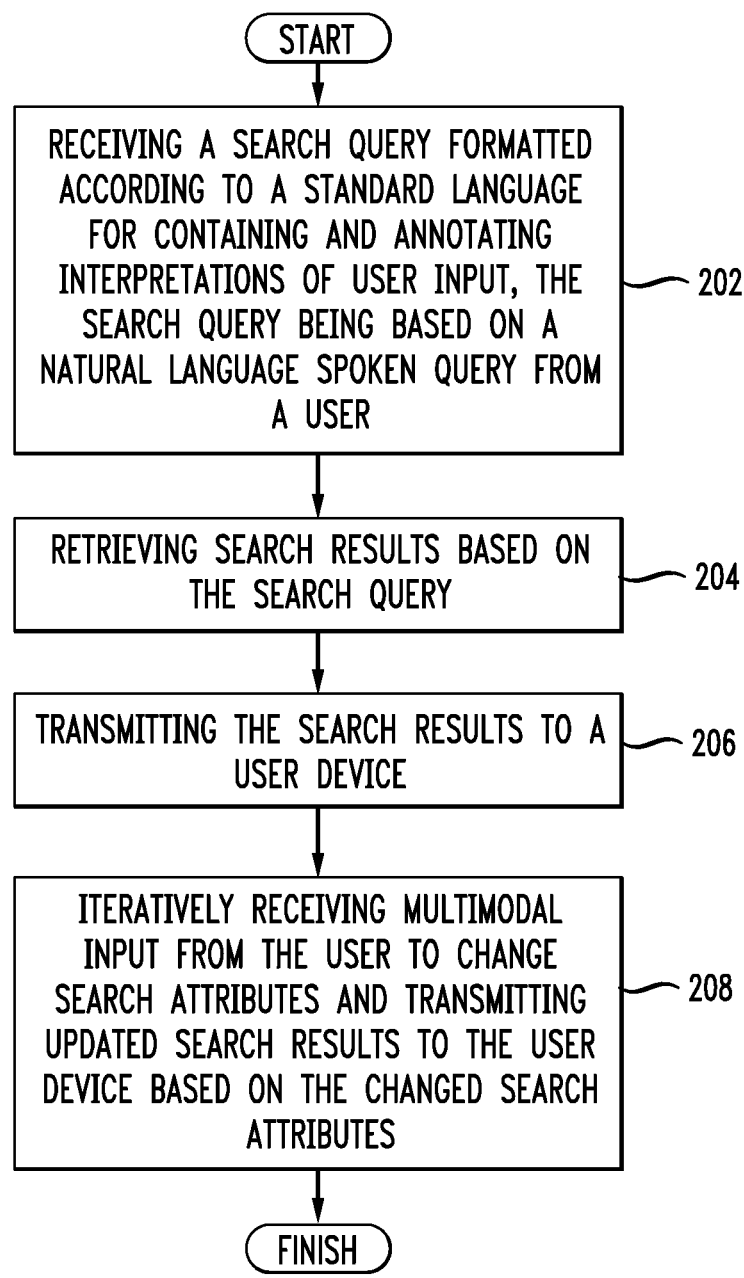
FIG. 2 illustrates an example method embodiment.

Having disclosed some basic system components, the disclosure now turns to the exemplary method embodiment shown in FIG. 2 for providing an iterative disambiguation interface. For the sake of clarity, the method is discussed in terms of an exemplary system such as is shown in FIG. 1 configured to practice the method. The system 100 can be a server residing in a network, such as a telecommunications provider network, which interacts with mobile communications devices such as cellular phones, computers, smart phones, PDAs, and other suitable devices. The system 100 can interact directly with the mobile communications devices if they have sufficient computing resources to produce standard XML markup language. If the devices do not have sufficient computing resources, such as an older landline phone, the system 100 can communicate with or incorporate an intermediary server that analyzes the speech commands to produce XML.

The system 100 receives a search query formatted according to a standard language for containing and annotating interpretations of user input, the search query being based on a natural language spoken query from a user (202). One example of a standard language is the XML-based EMMA from W3C. This disclosure contains various examples of properly constructed EMMA-based XML markup.

The system 100 retrieves search results based on the search query (204). The search results can include a link to additional information related to the search results. For example, if the search results are a movie titles or other media available for consumption, the additional information can be a video presentation, audio file, multimedia stream or other resource. If the search results are laptops, the additional information can be a link to purchase the laptop, visit the technical support site for that model of laptop, or call technical support for that model.

Figure 6:
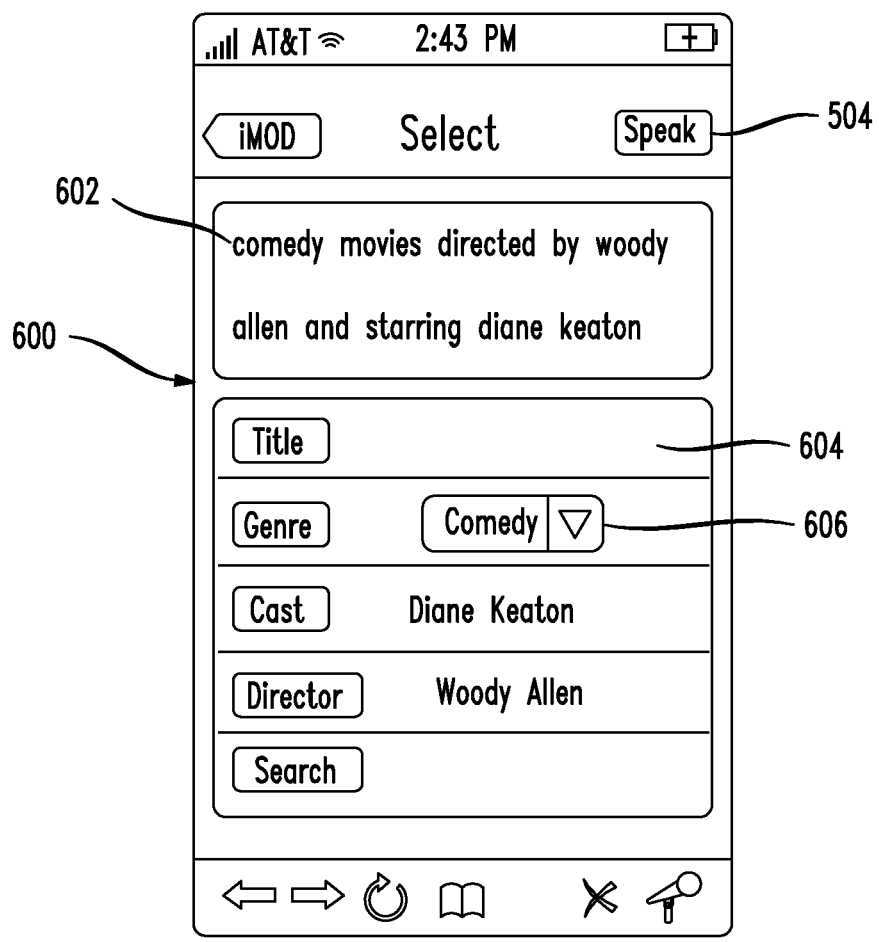
FIG. 6 illustrates an example populated search interface view on a mobile device screen.

The system 100 transmits the search results to a user device (206) which displays the search results to the user. The user can then select one or more items in the search results to obtain additional details or the user can edit or modify the originally entered speech query using multimodal input, as shown in FIG. 6. The system 100 iteratively receives multimodal input from the user to change search attributes and transmits updated search results to the user device based on the changed search attributes (208). As the system performs this step, the system 100 can generate a transaction history of each iteration of receiving multimodal input and transmitting updated search results. This can be helpful if a user decides that a particular edit was not what he or she wanted and wants to revert to a previous state. This can also be helpful for users when they find two interesting "branches" in a search and want to go back to more fully explore a particular "branch" at a later time. Thus, the system 100 can save and later present the transaction history to the user and resume the iterative steps.

In another aspect, the system receives the search query from one or more users. The users collaboratively interact with each other and the system to provide multimodal input to change search attributes via their own individual devices and receive from the system updated search results at each of their individual user devices simultaneously based on the changed search attributes. In this aspect, a user can break away from the group users and develop their own independent query. For example, if the group is searching for Batman videos and one user notices Jack Nicholson in the 1989 Batman movie, that user can leave the group and continue his own search for movies starring Jack Nicholson. Later that user can rejoin the group search effort, and even bring in a suggestion from his individual search efforts.

Figure 3:
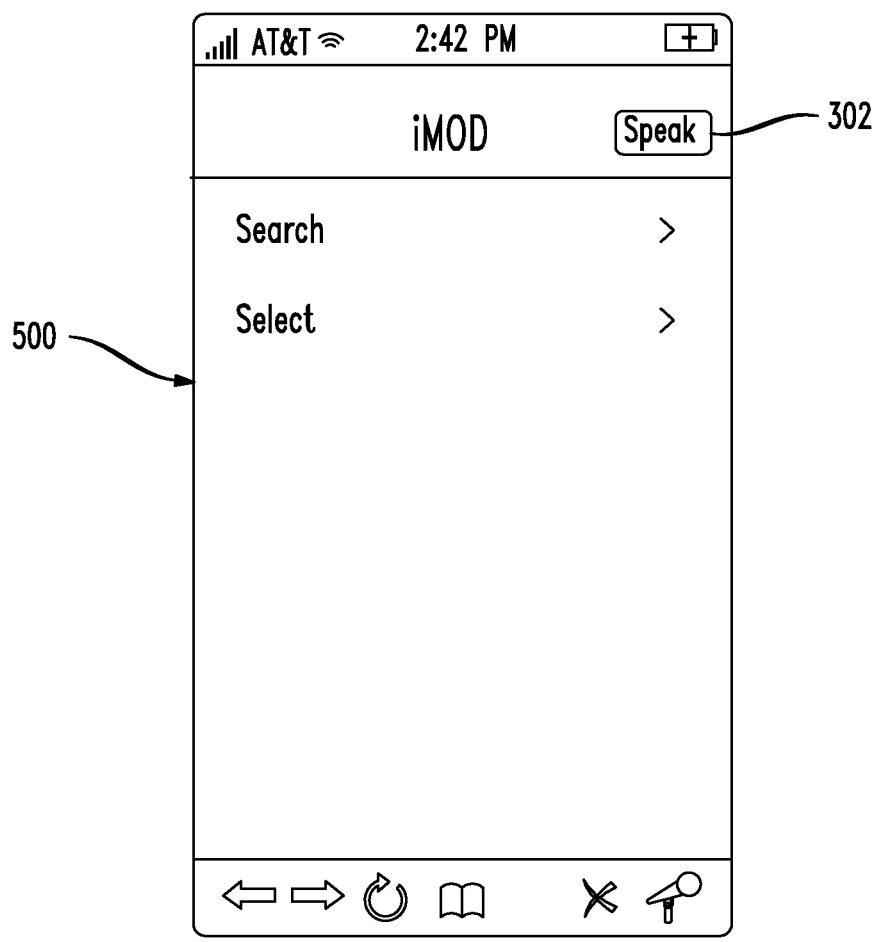
FIG. 3 illustrates an example initial search view on a mobile device screen.
Figure 4:
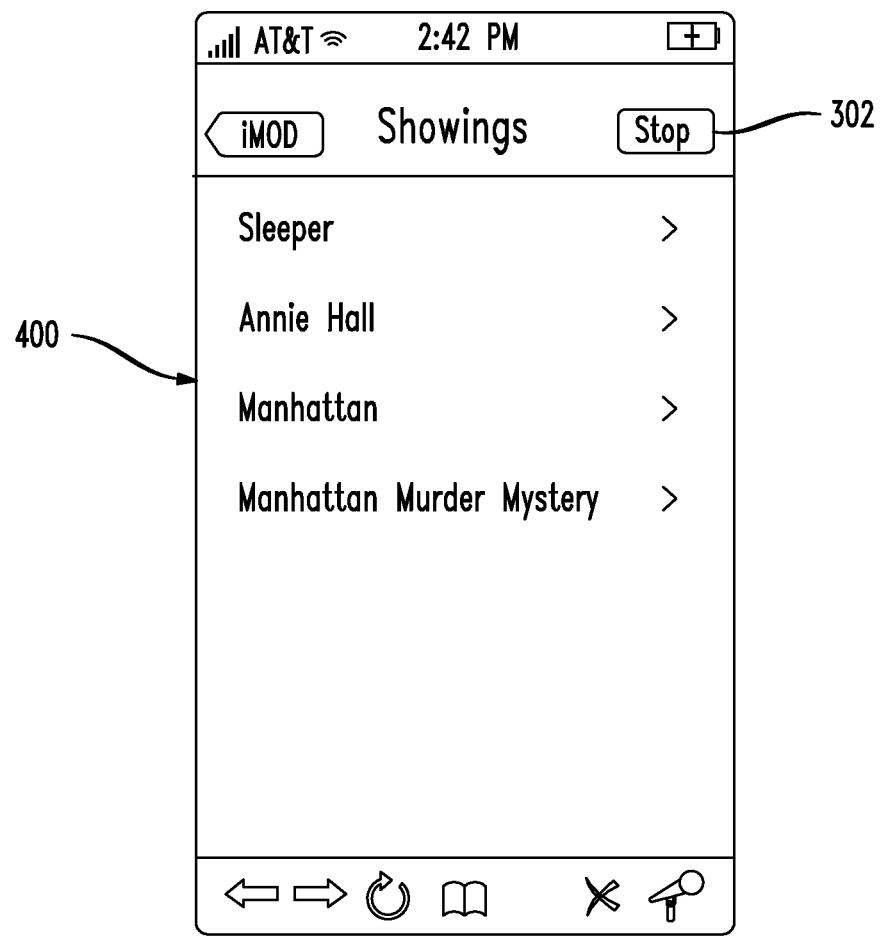
FIG. 4 illustrates an example results view on a mobile device screen.
Figure 5:
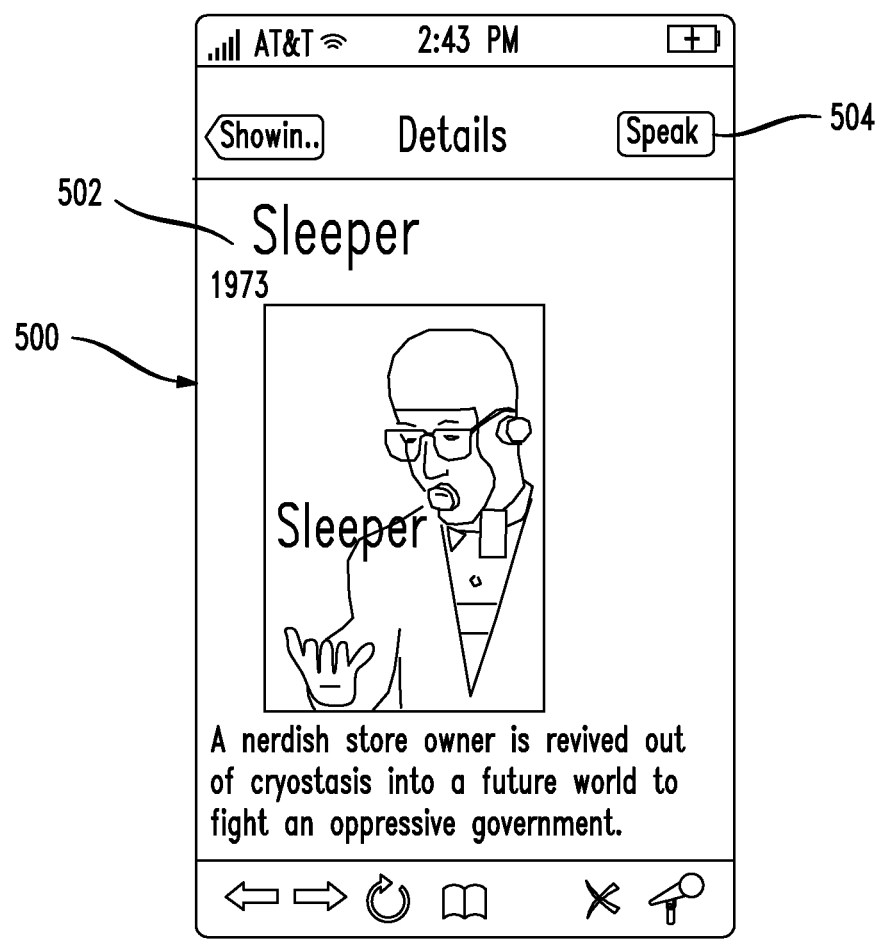
FIG. 5 illustrates an example detail view on a mobile device screen.

The disclosure now turns to an exemplary multimodal voice search interface for finding movies in a mobile video-on-demand application. As more and more content is available to consumers, through services such as IPTV, video-on-demand, and music download and subscription services, users encounter increasing difficulty in finding the content they want. One way to address this problem is using a speech-enabled multimodal interface to search and browse for media content. An exemplary system 100, such as the system shown in FIG. 1, built using the framework described above, can enable users to search and browse for movies on mobile devices such as the iPhone or Palm Pre based on range of different constraints, such as title, genre, actors, or director. Queries can be in natural language and can freely combine different constraints. FIG. 3 illustrates an example initial search view 300 on a mobile device screen. In this initial screen, the user hits the Speak button 302 and issues a spoken command, for example "comedy movies directed by Woody Allen and starring Diane Keaton." The system 100 returns a spinnable list 400 of titles, as shown in FIG. 4. The user can select an individual result 402 in the list to view details 502 and/or play the content, as shown in the display 500 of FIG. 5.

EMMA documents are used both for communication with the ASR server and with the Multimodal fusion server, which in this case is used for unimodal spoken language understanding. In the example described above, after the user hits the Speak button 302, 504 the system 100 streams audio over HTTP to the ASR server through the Speech Mashup, and the mashup returns an EMMA document containing a single recognition result, an example of which is shown below.

EMMA Response from ASR

```
<emma:emma>
    <emma:interpretation>
        id="int1"
```

```
            emma:medium="acoustic"
            emma:mode="voice"
            emma:function="dialog"
            emma:verbal="true"
            emma:start="1241035886246"
            emma:end="1241035889306"
            emma:confidence="0.8"
            emma:process="smm:type=asr&version=watson6">
                <emma:literal>comedy movies directed by
        woody
            allen and starring diane
        keaton</emma:literal>
        </emma:interpretation>
    </emma:emma>
```

For the sake of presentation the full set of annotation elements and attributes are not included. The system 100 then sends this document from the multimodal client to the Multimodal fusion server as an HTTP post, but can send the document in other ways, such as via SMS, email, FTP, a network socket, or other suitable electronic communication. The Multimodal fusion server returns the EMMA document shown below to the client.

EMMA from Fusion Server

```
<emma:emma>
    <emma:interpretation
            id="int2"
            emma:tokens="comedy movies directed by woody
            allen and starring diane keaton"
            emma:confidence="0.7"
            emma:process="smm:type=fusion&version=mmfst1.0">
            <query><genre>comedy</genre>
                <dir>woody_allen</dir>
                <cast>diane_keaton</cast></query>
            <emma:derived-from resource="#int1"/>
    </emma:interpretation>
    <emma:derivation>
            <emma:interpretation id="int1"
            emma:medium="acoustic"
            emma:mode="voice"
            emma:function="dialog"
            emma:verbal="true"
            emma:start="1241035886246"
            emma:end="1241035889306"
            emma:confidence="0.8"
            emma:process="smm:type=asr&version=watson6">
            <emma:literal>comedy movies directed by woody
            allen and starring diane keaton</emma:literal>
            </emma:interpretation>
    </emma:derivation>
</emma:emma>
```

Here the element emma:derived-from is used to provide a reference to the resource emma:interpretation from which this new emma:interpretation was derived. The element emma:derivation is used as a container for the earlier stage of processing. Note that any annotations which appear on the earlier stage of processing (int1) are assumed to apply the later stage (int2) unless they are explicitly restated (e.g. emma:process and emma:confidence). The semantic interpretation from this document (query) is used by the client to build a URL expressing a database query and this is then issued to the database server. The database server returns an XML document containing details for each of the matching movies, and these are used by the client code to build an html list of results which is dynamically inserted into the results view shown in FIG. 4. In addition to issuing the database query when the EMMA markup from the fusion server is received the semantic representation is used to populate an interface such as the one shown in FIG. 6 which users can navigate to in order repair errors or refine their query and reissue it. This can be done using one or more of speech, keyboard input, or for some parameters using graphical widgets.

In this example case the user touches the "Genre" button or the "Genre" pulldown 606 and selects the appropriate genre. Similarly, the user can touch the title field 604 or the "Cast" button, say "Mia Farrow", then hit "Search" in order to modify the search string 602 to issue the search "comedy movies directed by Woody Allen and starring Mia Farrow". The system 100 can provide this interface iteratively so the user can refine and re-refine the original spoken search query until the user is satisfied with the results and/or finds what she is searching for.

In one aspect, the input and outputs are separable. For example, a user can provide speech, text, and gesture inputs through a mobile phone and view the results on a television or computer. In another aspect, multiple users can collaborate on a search on their own devices, updated in real time. For example, two sisters are trying to locate a particular movie together. Each sister enters information on her own mobile device and the system 100 updates the query and/or the search results simultaneously on both phones. In another aspect, the system 100 records the EMMA XML documents as a history on the mobile devices and/or a server. The system 100 can then replay searches or provide an index to the searches and corresponding results for later review.

The applications described above can be built using a multimodal rapid prototyping framework which combines a multimodal browser, with web services for speech recognition and synthesis, and multimodal understanding, and database access. FIG. 7 provides an overview of this framework 700 and the communication among client components 702 and server components 704. The multimodal client can be a native application running on a computing device, such as the iPhone which combines a full HTML browser 706 with an audio capture and streaming component 708, and a GPS component 710 which provides access to geolocation and device orientation. Communication between the HTML browser 706 and the Audio 708 and GPS components 710 can be established through HTTP access to a set of dedicated URL types (e.g. 'watson://start asr . . . '), which are captured by the containing application and responses are returned through javascript or AJAX callbacks.

The developer of each multimodal application authors their application using a combination of HTML, JavaScript, and CSS, hosted on an application server. As each application is accessed, the multimodal client loads the relevant files from the application server 712. As a result, changes in the application can be made and tested rapidly without recompiling and downloading a new native application to the device 702. This is an important property for rapid prototyping and testing of new applications and services, especially for trials where it may not be easy or feasible to constantly update participants' devices. Once users have the multimodal client on their device, making a new multimodal prototype available to them is simply a matter of adding it to the application server 712. Using an HTML browser 706 can be important for rapid prototyping because it allows easy access to all of the graphical interface elements, layout mechanisms, and capabilities of HTML, CSS, and JavaScript. The sample application described herein can make use of a combination of JavaScript and CSS that simulates the appearance of a native application, including a navigation bar, spinnable lists of results, and animated navigation between sections of the user interface.

A speech mashup application 714 enables developers to easily add speech capabilities to web applications, in much the same way that mechanisms such as Google Maps, Live Maps, and Yahoo! Maps enable easy integration of dynamic mapping capabilities. The speech mashup platform 714 provides HTTP access to automatic speech recognition (ASR) and synthesis (TTS). In the case of ASR, in response to a JavaScript command in the HTML browser 706, the Audio component 708 in the multimodal client collects audio and streams it via HTTP to the mashup server 714, which performs ASR and returns an EMMA document containing the recognition results. Parameters can be set in the HTTP request to the ASR in order to request N-best, in which case multiple results are returned in emma:one-of. In the case of TTS, an SSML document is posted from the multimodal client to the mashup server 714, and an HTTP stream of audio is returned and played on the client. In addition to HTTP access at runtime for recognition, the speech mashup platform 714 also supports HTTP access for posting and compiling grammars, and a user portal where developers building prototypes can upload and manage grammar models. Both fixed deterministic grammars and stochastic language models are supported. The portal also supports monitoring of ASR logs and provides tools for rapid online transcription of audio.

The Multimodal Fusion server 716 utilizes finite state methods for combination and understanding of speech with tactile gesture inputs, such as touch and pen. This server can also be used for unimodal spoken language understanding, in which case the gesture input is empty. Access to this server is through HTTP, for example. In the sample application disclosed herein, an AJAX request is made from JavaScript in the client application. An EMMA XML document containing the speech string and or a gesture lattice is posted to the multimodal fusion server 716 and the server returns an EMMA XML document containing their combined interpretation. If no interpretation is available then the server returns an empty emma:interpretation annotated as emma:uninterpreted="true". The server also supports the use of finite state edit machines for multimodal understanding, enabling the coupling of a stochastic language model for recognition with a deterministic finite state integration and understanding model.

The final server used in the rapid prototyping framework is a simple database server 718 using SQLite or other suitable database which provides access through AJAX to the underlying database used in the application. This server provides a URL syntax for specification for the database to be queried and specification of constraints on fields, which are used to construct an SQL query and retrieve results. The mechanism also allows specification in the query of the format of the results to be returned, and the server returns results as an XML document containing a number of records. These XML results are then manipulated in the client JavaScript code in order to dynamically create HTML content for display lists of results or details regarding items the user searches for. The server can be set up to be general purpose and can easily reused for a range of different databases (movies, books, restaurants, corporate directory) without modification of the database server itself.

In the architecture and sample prototype applications described here, access to resources, such as ASR, multimodal understanding, and database lookup are handled as separate HTTP queries. This increases the number of network roundtrips though in practical application should not be a significant source of latency. The advantage of this approach for prototyping is that it allows centralization of application logic in the client code, simplifying authoring, and allows easy implementation of feedback mechanisms on the user interface as each stage of processing takes place. Also, in several cases, such as presenting N-best recognition results, the interface designer may want to seeks user input or confirmation between processing stages. The architecture also provides a number of mechanisms for tighter integration of processing stages which can avoid the multiple HTTP requests. The mashup platform 714 allows for specification of a POST URL in an ASR query, so that instead of being returned directly to the client, the results of a speech recognition are passed to another server for processing. The speech recognizer in the speech mashup platform 714, for example, also supports specification of commands (in Python) to be executed on the speech recognition results. Both of these mechanisms enable implementation of single query HTTP access, where audio packets are sent to the ASR server and the result that comes back is a list of database entries. Note however that this significantly complicates iterative development at the prototyping stage since the application logic becomes distributed over multiple different distributes parts of the system.

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

I claim:

1. A method comprising:
   receiving, from a first user device, a first search query associated with videos available via mobile video-on-demand;
   receiving, from a second user device, a second search query associated with the videos;
   retrieving search results according to a combination search query, the combination search query being a combination of the first search query and the second search query;
   transmitting the search results to the first user device and the second user device; and
   iteratively:
      updating a finite state edit machine according to multimodal input, wherein the multimodal input is iteratively received from the first user device to modify the combination search query, to yield a modified combination search query; and
      transmitting updated search results to the first user device and the second user device, wherein the updated search results are according to the modified combination search query.

2. The method of claim 1, the method further comprising:
   generating a transaction history of each iteration of receiving multimodal input and transmitting the updated search results.

3. The method of claim 2, the method further comprising:
   presenting the transaction history at the first user device.

4. The method of claim 1, wherein the updated search results are transmitted to the first user device and the second user device simultaneously.

5. The method of claim 1, wherein the search results comprise a link to additional information related to the search results.

6. The method of claim 5, wherein the additional information is a video presentation from the videos available by mobile video-on-demand.

7. The method of claim 1, wherein the search results are retrieved from a listing of media available for consumption.

8. A system comprising:
   a processor; and
   a computer-readable storage device having instructions stored which, when executed by the processor, result in the processor performing operations comprising:
      receiving, from a first user device, a first search query associated with videos available via mobile video-on-demand;
      receiving, from a second user device, a second search query associated with the videos;
      retrieving search results according to a combination search query, the combination search query being a combination of the first search query and the second search query;
      transmitting the search results to the first user device and the second user device; and
      iteratively:
         updating a finite state edit machine according to multimodal input, wherein the multimodal input is iteratively received from the first user device to modify the combination search query, to yield a modified combination search query; and
         transmitting updated search results to the first user device and the second user device, wherein the updated search results are according to the modified combination search query.

9. The system of claim 8, the computer-readable storage device having additional instructions stored which, when executed by the processor, result in operations comprising:
   generating a transaction history of each iteration of receiving multimodal input and transmitting the updated search results.

10. The system of claim 9, the computer-readable storage device having additional instructions stored which, when executed by the processor, result in operations comprising:
    presenting the transaction history at the first user device.

11. The system of claim 8, wherein the updated search results are transmitted to the first user device and the second user device simultaneously.

12. The system of claim 8, wherein the search results comprise a link to additional information related to the search results.

13. The system of claim 12, wherein the additional information is a video presentation from the videos available by mobile video-on-demand.

14. The system of claim 8, wherein the search results are retrieved from a listing of media available for consumption.

15. A computer-readable storage device having instructions stored which, when executed by a computing device, result in the computing device performing operations comprising:
    receiving, from a first user device, a first search query associated with videos available via mobile video-on-demand;
    receiving, from a second user device, a second search query associated with the videos;
    retrieving search results according to a combination search query, the combination search query being a combination of the first search query and the second search query;
    transmitting the search results to the first user device and the second user device; and
    iteratively:
       updating a finite state edit machine according to multimodal input, wherein the multimodal input is iteratively received from the first user device to modify the combination search query, to yield a modified combination search query; and
       transmitting updated search results to the first user device and the second user device, wherein the updated search results are according to the modified combination search query.

16. The computer-readable storage device of claim 15, having additional instructions stored which, when executed by the processor, result in operations comprising:
    generating a transaction history of each iteration of receiving multimodal input and transmitting the updated search results.

17. The computer-readable storage device of claim 16, having additional instructions stored which, when executed by the processor, result in operations comprising:
  presenting the transaction history at the first user device.

18. The computer-readable storage device of claim 15, wherein the updated search results are transmitted to the first user device and the second user device simultaneously.

19. The computer-readable storage device of claim 15, wherein the search results comprise a link to additional information related to the search results.

20. The computer-readable storage device of claim 19, wherein the additional information is a video presentation from the videos available by mobile video-on-demand.

* * * * *